3,116,331
HYDROGENATION OF ALKENYL AMINES
Douglas G. Norton, Berkeley, and John L. Van Winkle, Castro Valley, Calif., assignors to Shell Oil Company, New York, N.Y., a corporation of Delaware
No Drawing. Filed May 19, 1961, Ser. No. 111,169
6 Claims. (260—583)

This invention relates to the preparation of alkyl amines. More particularly, it relates to a process for the preparation of dialkyl secondary amines from tri(beta,gamma-alkenyl)amines.

Diallyl amine is an important chemical of commerce and is readily prepared by the reaction of an allyl halide, such as allyl chloride, with ammonia. In this process, however, undesirably large amounts of triallyl amine are formed for which no ready market may exist. It is therefore frequently required to convert the triallyl amine to some more economically attractive product and to do so with a minimum of caiptal expenditure and other costs.

It is an object of the present invention to provide a method for the conversion of triallylic amines to the corresponding dialkyl secondary amines. Another object of the invention is the provision of a catalytic process for conducting this conversion in an economic and effective manner. Another object of the invention is the provision of a process for hydrogenating triallylic amines in the presence of hydrogenation catalysts, while still another object is the provision of a continuous process for such hydrogenation. Other objects will be apparent from the following detailed discussion of the invention.

These objects are accomplished in the invention by the process which comprises hydrogenating tri(beta,gamma-alkenyl)amine in the presence of a hydrogenation catalyst, and separating the resulting dialkyl amine from the tri(beta,gamma-alkenyl)amine.

By tri(beta,gamma-alkenyl)amine is meant an amine consisting of a nitrogen atom whose three valences are each directly connected to an allylic substituent. Such compounds have in general the structure

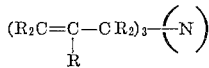

wherein each R is selected from the group consisting of the hydrogen atom and lower alkyl. Preferred compounds are those wherein each of the allylic substituents has from 3 to 10 carbon atoms.

Exemplary of such compounds are tri(2-butenyl)amine; tri(2-pentenyl)amine; tri(2-decenyl)amine; tri(5-methyl-2-hexenyl) amine; tri(4,5-dimethyl-2-heptenyl)amine; tri(menthallyl) amine and tri(ethallyl)amine. Particulaly preferred because of the excellent yields afforded by its use is triallyl amine.

The process is readily conducted by reacting together a tri(beta,gamma-alkenyl)amine of the type described with hydrogen in contact with a hydrogenation catalyst. The reaction may be conducted in either the liquid or the vapor phase. The most satisfactory catalysts to use, because of the ease with which they may be separated from the reaction system, are the solid hydrogenation catalysts. Such catalysts are preferably selected from metals of groups I, II and IV through VIII of the periodic table, their alloys and derivatives such as their sulfides, oxides and chromites. Examples include silver, copper, iron, manganese, molybdenum, platinum, chromium, cobalt, rhodium, tungsten, mixtures of metals, such as copper-silver mixtures, copper-chromium mixtures, nickel-cobalt mixtures, and their derivatives such as copper oxides, copper chromite, nickel sulfide, silver sulfide, and the like. Particularly preferred catalysts are the members of the group consisting of nickel, copper, cobalt, iron, chromium, silver, palladium and platinum, and their oxides, sulfides and chromites. Exemplary of such catalysts are Raney nickel and copper chromite. These catalysts may be employed in a finely divided form and dispersed in and throughout the reaction mixture, or they may be employed in a more massive state, either in essentially the pure state or supported upon or carried by an inert carrier such as pumice, kieselguhr, diatomaceous earth, clay, alumina, charcoal, carbon or the like, and the amine and hydrogen contacted therewith, as by flowing the mixture over or through a bed of the catalyst or according to other methods known in the art.

The amount of catalyst employed may vary over a wide range, depending on the nature of the amine, the type of catalyst employed, the reaction conditions, and the like. In general, the amount of catalyst employed will vary from about 0.1% w., based on the amine, to about 40% w. on the same basis, but larger or smaller amounts, i.e., up to about an equal weight, based on the amine, are effective. Most preferred range is from about 1% w. to about 15% w. of catalyst, based on the amine, although from 2–3% w. may be adequate.

The reaction may be conducted in any suitable apparatus. It is an important feature of the invention that the hydrogenation takes place very readily under comparatively mild hydrogenation conditions, and so the use of extremely high-pressure equipment is not required, thus contributing materially to the economy with which the process may be practiced. Thus, while superatmospheric pressures as high as 3000 p.s.i.g. or 5000 p.s.i.g. may be employed for the hydrogenation, it proceeds suitably in general at hydrogen pressures of from about atmospheric to about 1000 p.s.i.g. Best operation is achieved at hydrogen pressures of only about 50 to about 100 p.s.i.g.

Relatively low temperatures may also be employed. Thus, while the hydrogenation of the allylic amine may be conducted at temperatures up to the decomposition temperature of the amine, it will proceed readily at temperatures of from about 0° C. to about 300° C. The preferred range for optimal results is from about 50° C. to about 100° C., illustrating the unexpectedly mild conditions under which the hydrogenation of the invention occurs.

Hydrogenation of the tri(beta,gamma-alkenyl)amine under the conditions recited is readily accomplished under any circumstances permitting intimate contact between the amine, the hydrogen and the catalyst. Thus, either the liquid phase or the vapor phase may be employed. When conducting the reaction in the liquid phase, inert solvents may be used as diluents or for temperature control. Typical solvents include paraffins such as cyclohexane, pentane, hexane, heptane and octane; ethers such as ethyl ether, isopropyl ether, butyl ether, tetrahydrofuran and dioxane; alcohols such as methanol, ethanol, propanol, butanol, cyclohexanol and the like; and esters such as ethyl acetate, amyl acetate, butyl propionate and similar liquids. Preferred solvents are those having up to 6 carbon atoms.

The reaction is readily followed by observation of the uptake of hydrogen. At the close of the reaction, the desired dialkyl secondary amine may readily be separated from the reaction mixture by conventional methods, such as fractional distillation, solvent extraction, crystallization, selective sorption and the like. Unreacted tri(beta,gamma-alkenyl)amine and any saturated trialkyl amine may conveniently be recycled after separation of the desired dialkyl amine, or all saturated amines may be recovered and separated, and the allylic amines recycled.

It will be seen from this description of the invention that a wide variety of dialkyl amines may be easily prepared from tri(beta,gamma-alkenyl)amines wherein each of two alkenyl substitutents have the same number of carbon atoms as the alkyl substituents of the product. In accordance with the notation above, these amines will have the structure $(CR_2-CR_2-CR_2)_2NH$, where R as alkly may have up to 4 carbon atoms. Thus, tri(2-butenyl)amine is easily converted to dibutyl amine; tri(2-pentenyl)amine to dipentyl amine; tri(methallyl)amine to diisobutyl amine; and triallyl amine to dipropyl amine.

The novel and unexpected features of the invention are illustrated by the following examples. It should be understood, however, that the examples are merely illustrative and are not to be regarded as limitations to the appended claims, since the basic teachings thereof may be varied at will, as will be understood by one skilled in the art. In the examples, the proportions are expressed in parts by weight unless otherwise noted.

*Examples*

A series of hydrogenations was conducted in a 300 cc. rocking autoclave disposed so that hydrogen under constant pressure could be charged thereto. Triallylamine feed (98.91% w. triallyl amine, 1.09% diallylamine) was employed. Product analysis was made by gas-liquid chromatography. The results obtained are presented in the following table.

| Moles Triallyl Amine Charged | Percent Wt. Raney Nickel Catalyst | Hydrogenation Temp., °C. | H₂ Pressure, p.s.i.g. | Moles Hydrogen Absorbed | Time, Minutes | Products, Mole percent | | |
|---|---|---|---|---|---|---|---|---|
| | | | | | | n-Propyl Amine | Di-n-propyl Amine | Tri-n-propyl Amine |
| 1.25 | 1.75 | 23-117 | 200 | 4.57 | 1300 | 2.58 | 42.75 | 50.8 |
| 1.25 | 2.92 | 70-181 | 200-600 | 4.72 | 225 | 4.0 | 50.7 | 41.8 |
| 0.262 as a 49.39% solution in octane | 9.73 | 178-215 | 300 | 0.817 | 27 | 0.97 | 41.8 | 42.6 |
| 0.584 | 2.44 | 149-154 | 80-160 | 2.30 | 622 | 1.25 | 46.6 | 50.2 |

Using the technique described, a sample of triallyl amine was hydrogenated over 2.4% w. Raney nickel at 150° C. and 80-160 p.s.i.g. until an amount of hydrogen equivalent to 94% of one double bond had occurred. The product distribution in the treated amine was as follows:

Amine— Mole percent
    n-Propylamine _____ 0.64
    Di-n-propylamine _____ 16.3
    Diallyl-n-propylamine _____ 20.9
    Allyl di-n-propylamine _____ 6.8
    Triallylamine _____ 54.5

In another experiment a flask was charged with a mixture of triallyl amine containing about 2.5% w. Raney nickel and hydrogen was bubbled through the stirred mixture. A slight back pressure of about 2 inches of mercury was maintained by using a mercury bubbler at the outlet. The temperature rose autogeneously to about 50° C. and remained at that point throughout the reaction. The hydrogenation was conducted in this manner for 12 hours. About 35% of the hydrogen employed was absorbed under these conditions.

At the end of that time, the amine mixture was separated from the catalyst and fractionally distilled. The saturated amines therein had the following composition:

| Amine | B.P., °C. | Percent w. | Conversion, Percent w. |
|---|---|---|---|
| Di-n-propylamine | 108-112 | 10.1 | 14.8 |
| Tri-n-propylamine | 156.5 | 86.0 | 81.5 |
| Heavy ends | | 3.9 | |

We claim as our invention:

1. The process comprising reacting tri(beta,gamma-alkenyl)amine, the alkenyl being from 3 to 10 carbon atoms, with hydrogen in the presence of a hydrogenation catalyst at atmospheric to 5000 p.s.i.g. pressure and from about 0° C. to about 300° C. temperature to form the corresponding dialkyl secondary amine.

2. The process comprising reacting tri(beta,gamma-alkenyl)amine, the alkenyl being from 3 to 10 carbon atoms, with hydrogen in the presence of Raney nickel at atmospheric to 5000 p.s.i.g. pressure and from about 0° C. to about 300° C. temperature to form the corresponding dialkyl secondary amine.

3. The process comprising reacting triallyl amine with hydrogen in the presence of a hydrogenation catalyst at atmospheric to 5000 p.s.i.g. pressure and from about 0° C. to about 300° C. temperature to form di-n-propyl amine.

4. The process of claim 3 wherein the catalyst is Raney nickel.

5. The process of claim 3 wherein the catalyst is copper chromite.

6. The process comprising reacting tri(beta,gamma-alkenyl)amine, the alkenyl being from 3 to 10 carbon atoms, with hydrogen in liquid phase in the presence of a hydrogenation catalyst at atmospheric to 5000 p.s.i.g. pressure and from about 0° C. to about 300° C. temperature to form the corresponding dialkyl secondary amine.

References Cited in the file of this patent

FOREIGN PATENTS 313,934    Great Britain _____ Jan. 14, 1928